(12) United States Patent
Ito et al.

(10) Patent No.: US 12,185,703 B2
(45) Date of Patent: Jan. 7, 2025

(54) FISHING LURE AND CENTER-OF-GRAVITY MOVABLE TUBE

(71) Applicants: MEGABASS, INC., Hamamatsu (JP); HEPHAIST CO., LTD., Kawagoe (JP)

(72) Inventors: Koichi Ito, Hamamatsu (JP); Hiroto Fukutome, Kawagoe (JP)

(73) Assignees: MEGABASS, INC, Hamamatsu (JP); HEPHAIST CO., LTD., Kawagoe (JP)

( * ) Notice: Subject to any disclaimer, the term of this patent is extended or adjusted under 35 U.S.C. 154(b) by 0 days.

(21) Appl. No.: 17/847,767

(22) Filed: Jun. 23, 2022

(65) Prior Publication Data

US 2023/0413793 A1   Dec. 28, 2023

(51) Int. Cl.
*A01K 85/16*   (2006.01)
*A01K 85/00*   (2006.01)

(52) U.S. Cl.
CPC .......... *A01K 85/16* (2013.01); *A01K 85/1837* (2022.02)

(58) Field of Classification Search
CPC ................ A01K 85/16; A01K 85/1837; A01K 85/1847; A01K 85/1853; A01K 85/18; A01K 85/1841; A01K 85/017
USPC ............ 43/42.31, 42.39, 42.48, 43.13, 42.22
See application file for complete search history.

(56) References Cited

U.S. PATENT DOCUMENTS

| | | | | |
|---|---|---|---|---|
| 3,044,207 | A * | 7/1962 | Dorsett .................. | A01K 85/16 43/42.22 |
| 4,464,857 | A * | 8/1984 | Olszewski ............. | A01K 85/16 43/42.53 |
| 5,992,084 | A * | 11/1999 | Kitagawa ............... | A01K 85/16 43/42.22 |
| 6,671,996 | B1 * | 1/2004 | Ito .......................... | A01K 85/16 43/42.31 |
| 2010/0251597 | A1 * | 10/2010 | Yatsenko ............... | A01K 85/16 43/42.35 |
| 2018/0249692 | A1 * | 9/2018 | Choi ...................... | A01K 85/00 |
| 2020/0015465 | A1 * | 1/2020 | Fukutome .............. | F16C 29/06 |
| 2020/0178510 | A1 * | 6/2020 | Choi ...................... | A01K 85/16 |
| 2021/0274762 | A1 * | 9/2021 | Yagi ....................... | A01K 85/12 |
| 2021/0386043 | A1 * | 12/2021 | Yamane ................. | A01K 97/02 |
| 2022/0378027 | A1 * | 12/2022 | Kawasaki .......... | A01K 85/1837 |
| 2023/0189776 | A1 * | 6/2023 | Kawasaki .......... | A01K 85/1847 43/42.35 |

FOREIGN PATENT DOCUMENTS

| | | |
|---|---|---|
| JP | 2016-082907 | 5/2016 |
| WO | WO-2018/110424 | 6/2018 |

* cited by examiner

*Primary Examiner* — Darren W Ark
*Assistant Examiner* — Zoe Tam Tran
(74) *Attorney, Agent, or Firm* — NIXON PEABODY LLP; Jeffrey L. Costellia (57) ABSTRACT

A fishing lure comprising a hollow lure body which is equipped with a forwardly slanting lip on one end, in which the hollow lure body contains in a center-of-gravity movable tube comprising a longitudinally straight tube body and a weight in the form of a stick which is capable of moving in the tube in the longitudinal direction, in which the tube is installed in the lure body in the position lower than the middle height of the hollow space of the lure body, and the weight has a vertical section symmetrical in its width direction and is in the form of polygon, semicircle or other.

2 Claims, 9 Drawing Sheets

FISHING LURE AND CENTER-OF-GRAVITY MOVABLE TUBE

FIELD OF THE INVENTION

The present invention relates to a fishing lure having a center-of-gravity movable tube (i.e. a tube whose center-of-gravity can move in the direction of longitudinal direction) in its body which varies its position of center-of-gravity in the body in accordance with slanting condition of the fishing lure, and further relates to a center-of-gravity movable tube which is favorably employed for placing in the fishing lure.

BACKGROUND OF THE INVENTION

In fishing sports are generally employed a lure having appearance analogous to a small fish for serving as a bait. In the known cast fishing, the lure connected to a fishing line is cast in a distant sea area from shore or wharf. In the cast fishing, the lure should be cast as distant as possible. Therefore, the lure generally has a weight in its body. In addition, the lure is prepared to take in the sea such a position inclining its head downward and to smoothly move in the sea or on the sea surface in accordance with the angler's operation, in such manner that a living fish takes in the sea or on sea surface.

Figure 1:
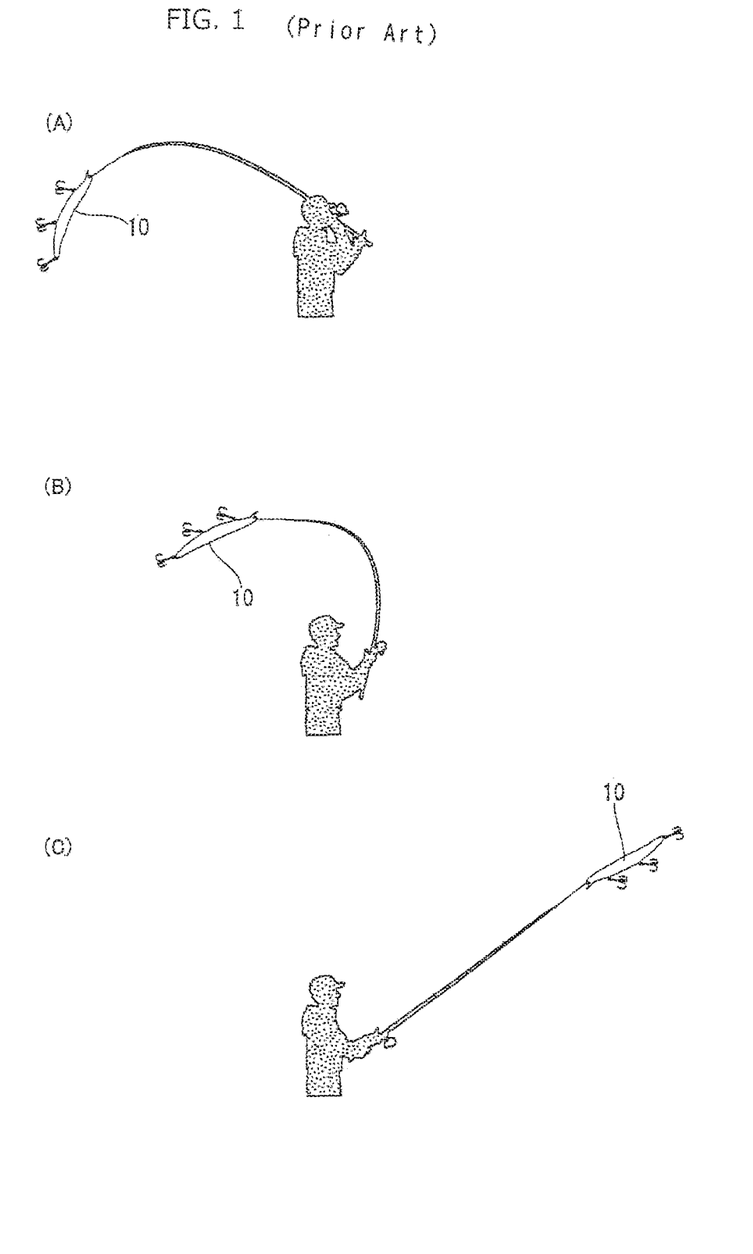
FIG. 1 shows typical actions for casting a fishing lure in the sea, lake or river, which are illustrated in the patent publication 1.

In patent publication 1, a series of angler's operations (A), (B) and (C) for casting the lure 10 is illustrated which are copied in FIG. 1.

Figure 2:
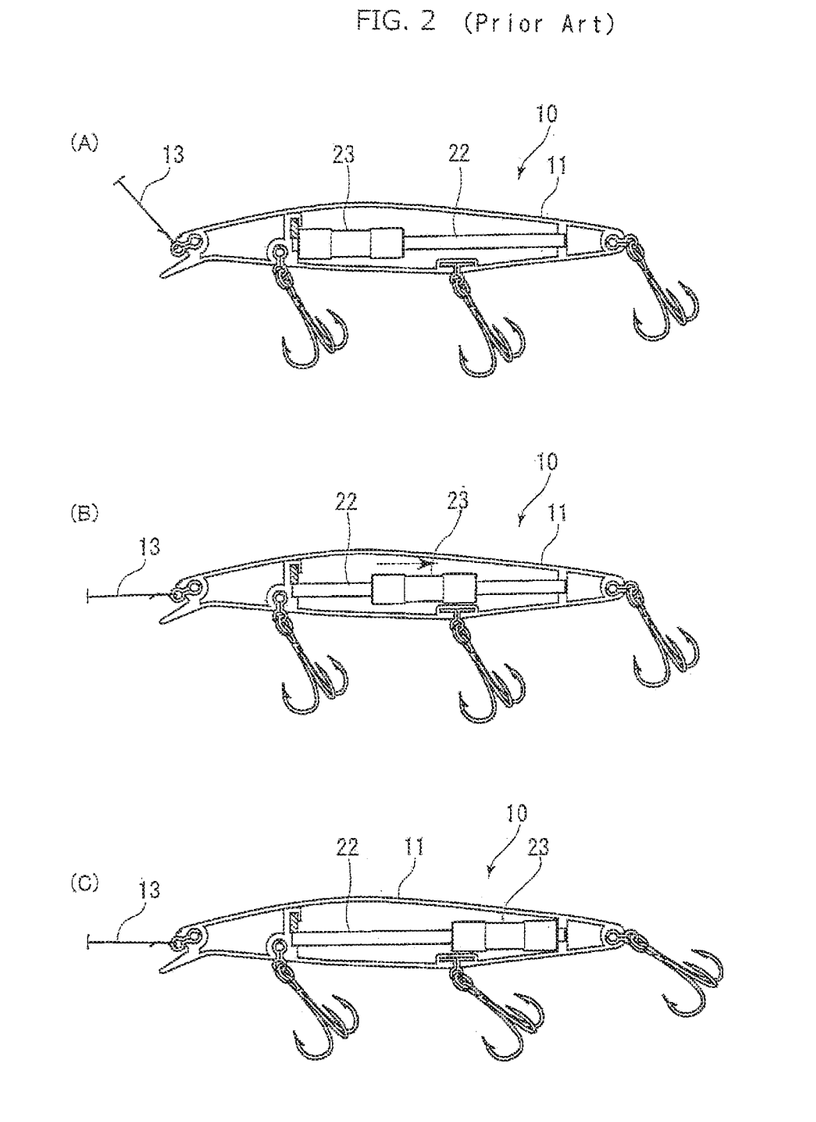
FIG. 2 shows the center-of-gravity movement mechanism of a linear bush included in the fishing lure which is also illustrated in the patent publication 1.
Figure 3:
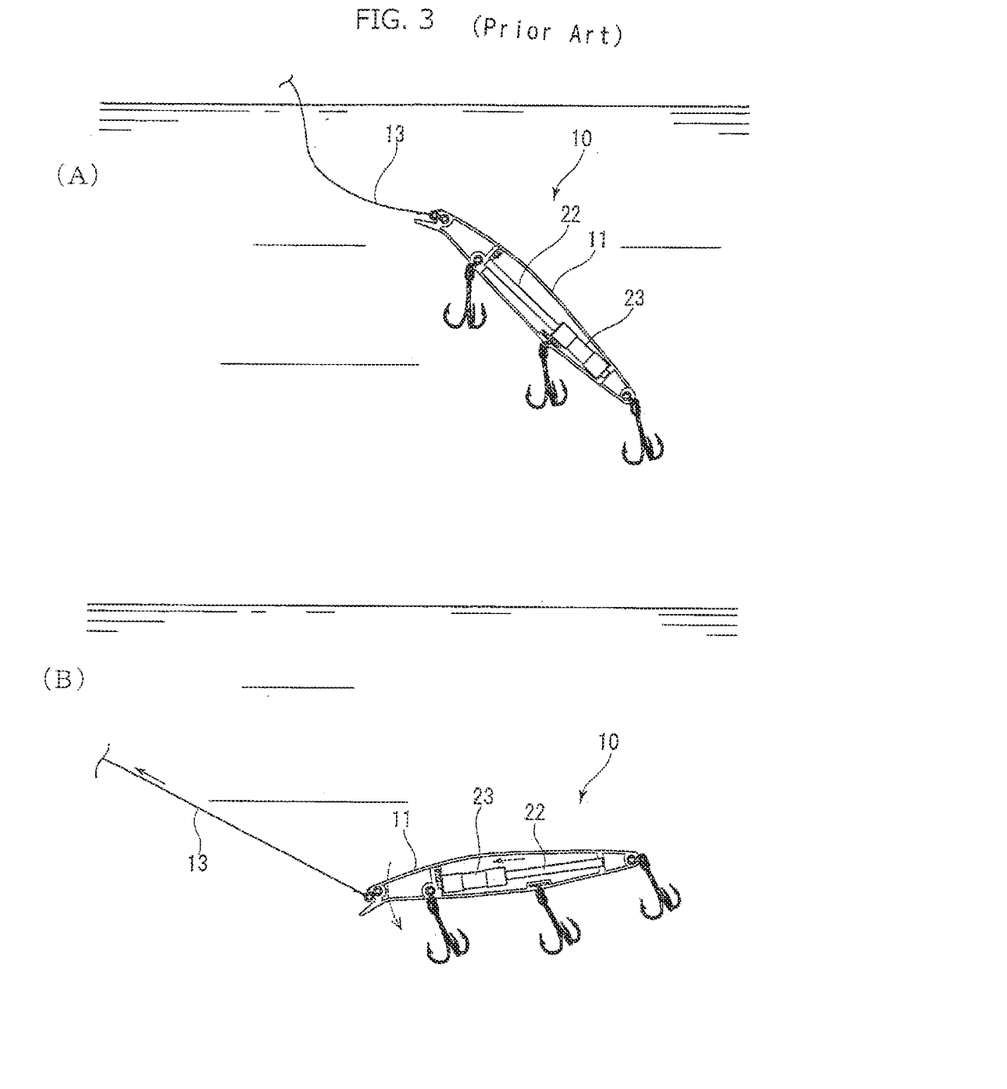
FIG. 3 shows behaviors of the fishing lure of FIG. 2 in the sea.

The patent publication 1 further illustrates a previously known lure having a movable weight (in the form of a known linear bush) therein, which is shown in FIG. 2. In FIG. 2, a series of movements of the weight in the lure body disclosed in the patent publication 1 are illustrated. In FIG. 2, (A), (B) and (C) illustrate the series of movements of a weight 23 in the form of a linear bush placed around a guide shaft 22 encased in the lure 10. In (A), the lure 10 takes a position before it is cast by the angler. The weight 23 is kept on a front side by means of a magnet provided in the front side of the lure 10. The weight 23 is then moved backward in the lure by the action of casting as is shown in (B). When the lure 10 is dropped into the sea, the weight 23 arrived to the end of the guide shaft 22, near the tail of lure. In FIG. 3, (A) illustrates the condition of the weight 23 in the lure 10 just dropped into the sea. Afterward, the weight 10 moves forward and tentatively fixed onto the magnet by the operation of the angler's action to pull the lure. In FIG. 3, (B) illustrates the condition of the weight 23 returned to the original position and tentatively fixed onto the magnet.

Figure 4:
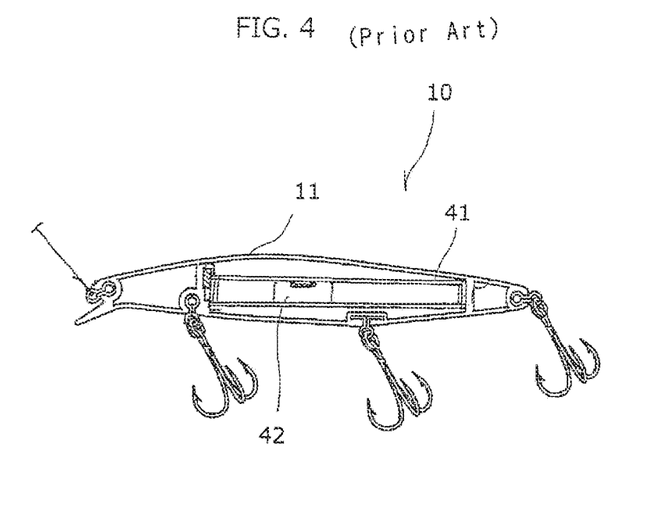
FIG. 4 shows a lure illustrated in the patent publication 2.
Figure 5:
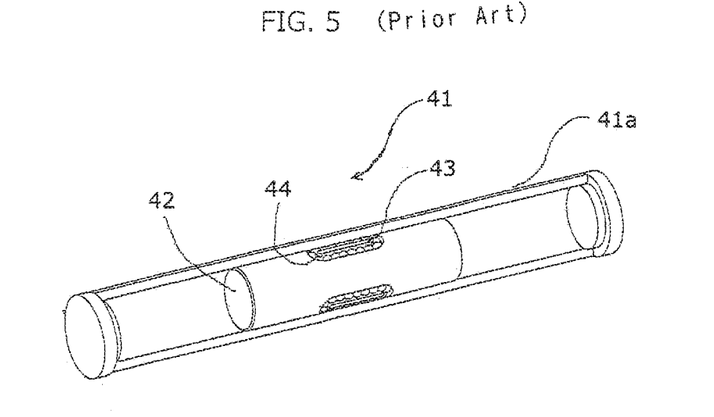
FIG. 5 shows a schematic view of a fishing lure of FIG. 4.

In patent publication 2, a lure 10 having a body that has a longitudinal space 11 therein (see FIG. 4) like a body similar to the lure body of the patent publication 1. However, the inner space 11 of the lure body 10 shown in the patent publication 2 has in the space 11 a movable weight 42 encased in a longitudinal straight pipe (i.e. center-of-gravity movable tube) 41, as is shown in FIG. 5. The center-of-gravity movable tube 41 shown in FIG. 5 is in the form of a circular cylinder and contains a linear bush 42 serving as a movable weight. The linear bush 42 is prepared in the form of a column. On the outer surface of the linear bush 42 are provided three or more rows of grooves 44 (serving as a ball circulation grooves) are formed. The grooves 44 are filled up with balls 43 so that the linear bush 42 can smoothly move in the longitudinal direction within the tube 41 in contact with the inner surface 41a of the tube 41.

The fishing lures disclosed in the patent publications 1 and 2 have the above-mentioned constitutions are favorably employed in the fishing sports.

PATENT PUBLICATION DISCLOSING PRIOR ART

Patent publication 1: Japanese laid-open patent publication 2016-82907
Patent publication 2: WO 2018/110424 A1

SUMMARY OF THE INVENTION

As described herein above, the fishing lures disclosed in the patent publications 1 and 2 have the above mentioned constitutions and are favorably employed in the fishing sports. However, the inventors of this application have noted certain problems when they utilize the fishing lures disclosed in the patent publications 1 and 2 in the fishing.

In more detail, the known fishing lures have a form similar to a small fish. Therefore, the known fishing lures including those disclosed in the patent publications 1 and 2 have center-of-gravity moving systems in which weight moves forward and backward keeping the center position in the lure body, that means a medium height of the lure body. See FIGS. 2 and 4. This means that the position of the center-of-gravity is kept on relatively higher site in the known fishing lures. For this reason, these fishing lures easily overturn when the lures receive irregular actions given by anglers or waves. Therefore, for most of the known fishing lures, it is not easy to always take normal positions of living small fishes in the sea.

Accordingly, it is a primary object of the present invention to provide a fishing lure capable of showing not only good characters of lures similar to the fishing lures disclosed in the patent publications 1 and 2, but also showing a high resistance to the overturn in sea, lake or river so as to be capable of showing natural actions of living small fishes.

The present inventors have studied the above-mentioned problems from the viewpoint of improvement of the fishing lure disclosed in the patent publication 2 and found that the below-described fishing lure equipped center-of-gravity movable tube can solve these problems.

A fishing lure having appearance analogous to a small fish and comprising a hollow lure body which is provided with a forwardly slanting lip on one end, in which the hollow lure body contains therein a center-of-gravity movable tube comprising a longitudinally straight tube and a weight body in the form of a stick which is capable of moving in the tube in the longitudinal direction, in which:
  the center-of-gravity movable tube is installed in the lure body in the position lower than the middle height of the hollow space of the lure body, and
  the weight body contained in the center-of-gravity movable tube has a vertical section which is symmetrical in its width direction and in the form of polygon, semicircle or a combination of polygon and semicircle.

The above-mentioned center-of-gravity movable tube is as such new.

The weight body which is movable in the center-of-gravity movable tube preferably has one or more below-described constitutions or forms:
  the vertical section of the weight body movable in the center-of-gravity movable tube has an essentially flat top surface;
  the weight body movable in the center-of-gravity movable tube has no protrusion on its top surface;

the vertical section of the weight body movable in the center-of-gravity movable tube is in the form of trapezoid having a width larger on the top than the width on the bottom side;

the vertical section of the weight body movable in the center-of-gravity movable tube is in the form of trapezoid having a width larger on the top than the width on the bottom side, and the vertical section of the weight body movable in the center-of-gravity movable tube has two ball circulation grooves in each of side surfaces and in each of corners, these ball circulation grooves are filled up with balls.

Effects of the Invention

The center-of-gravity movable tube provided by the invention enables smooth movement of the center-of-gravity in the manner that can be accomplished by those disclosed in the patent publications 1 & 2, and further the fishing lure equipped with the center-of-gravity movable tube the invention shows high resistance to the overturn in sea, lake or river so as to be capable of showing natural actions of living small fishes.

EMBODIMENT OF THE INVENTION

The fishing lure and the center-of-gravity movable tube of the invention are described in more detail using the attached FIGS. 6 to 11.

Figure 6:
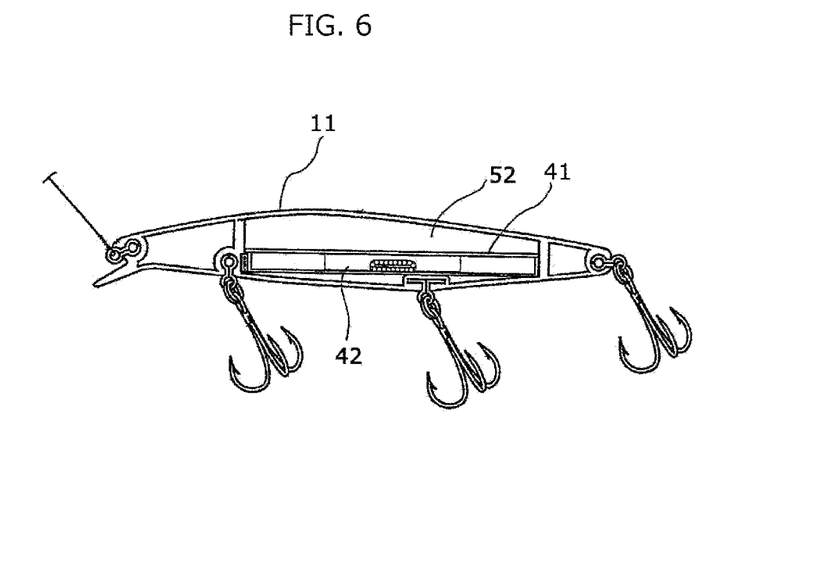
FIG. 6 shows a lure of the invention which indicates one of the characteristic features of the invention, that is, the center-of-gravity movable tube is installed in the lure body in the position lower than the center line of the inner space of the lure body.

As is easily understood from the attached FIG. 6, the fishing lure of the invention has a constitution similar to that of the fishing lure disclosed in the patent publication 2, which is a fishing lure 11 having appearance analogous to a small fish and comprising a hollow lure body which is provided with a forwardly slanting lip on one end, in which the hollow lure body 52 contains therein a center-of-gravity movable tube 41 comprising a longitudinally straight tubular body and a weight 42 in the form of a stick which is capable of moving within the center-of-gravity movable tube 41 in the longitudinal direction.

As is described above, the fishing lure of the invention is similar to the fishing lure disclosed in the patent publication 2. However the fishing lure of the invention is characteristic in the following features:

the center-of-gravity movable tube is installed in the lure body in the position lower than the middle height of the hollow space of the lure body, and the weight body contained in the center-of-gravity movable tube has a vertical section which is symmetrical in its width direction and in the form of polygon, semicircle or a combination of polygon and semicircle.

The weight body which is movable in the center-of-gravity movable tube preferably has one or more below-described constitution or form:

the vertical section of the weight body movable in the center-of-gravity movable tube has a flat top surface;

the weight body movable in the center-of-gravity movable tube has no protrusion on its top surface; which means an essentially flat top surface;

the vertical section of the weight body movable in the center-of-gravity movable tube is in the form of trapezoid having a width larger on the top than the width on the bottom side;

the vertical section of the weight body movable in the center-of-gravity movable tube is in the form of trapezoid having a width larger on the top than the width on the bottom side, and the vertical section of the weight body movable in the center-of-gravity movable tube has two ball circulation grooves in each of side surfaces and in each of corners, these ball circulation grooves are filled up with balls.

A representative structure of the fishing lure and the center-of-gravity movable tube of the invention are illustrated in FIGS. 6 to 9.

Figure 7:
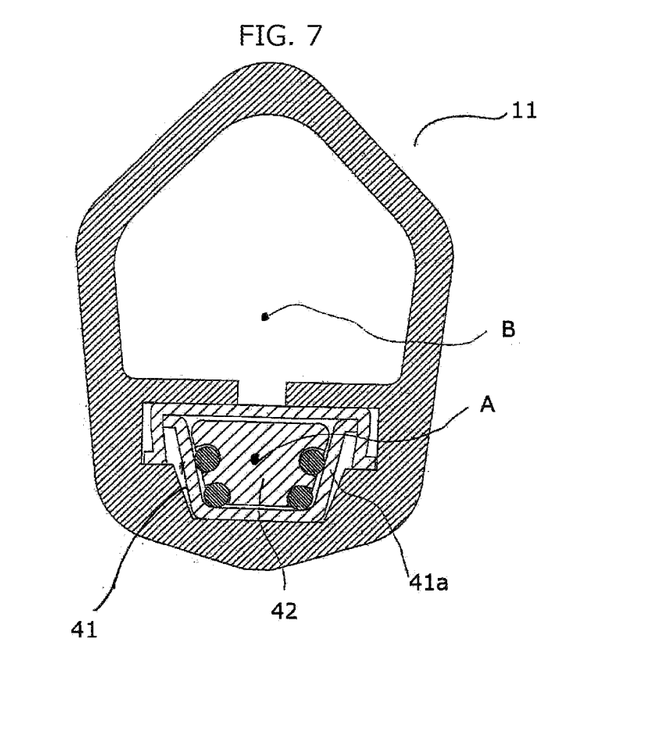
FIG. 7 shows a vertical section the fishing lure of the invention which illustrates a vertical section of one of representative center-of-gravity movable tubes.

As is understood from the above-mentioned description and figures, the fishing lure of the invention is characterized in that the center-of-gravity movable tube is installed in the lure body in the position lower than the middle height of the hollow space of the lure body. This means that a whole part of the center-of-gravity movable tube 41 is so placed that the weight body 42 encased in the tube 41 can move in keeping its position lower than the middle position (i.e. a position of lower than the center line extended in the hollow space of the lure body). The center line means an imaginary line extended from the center point B of FIG. 7 along the length of the center-of-gravity movable tube. The center point B designated in FIG. 7 is imaginary set in the hollow space of the lure body at the center of height of the lure body (i.e., the distance from the top surface to the bottom surface) and center of width of the lure body. The point A is a center point of the weight body 42 which is imaginary set in the weight body at the center of height and width.

Figure 8:
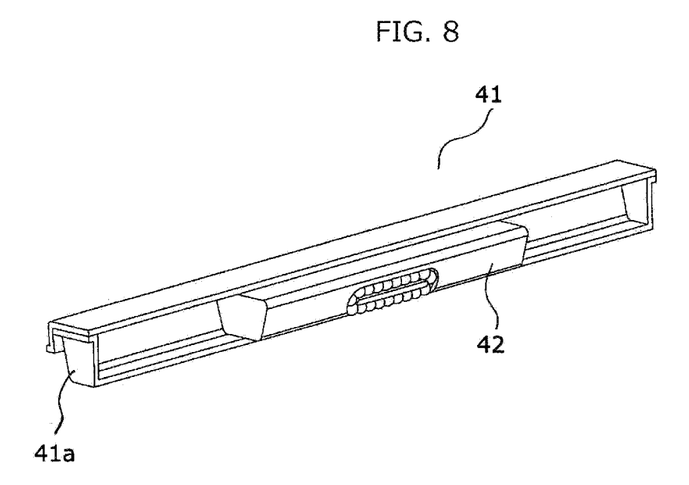
FIG. 8 shows a partially sectioned schematic view of the representative center-of-gravity movable tube illustrated in FIG. 7.
Figure 9:
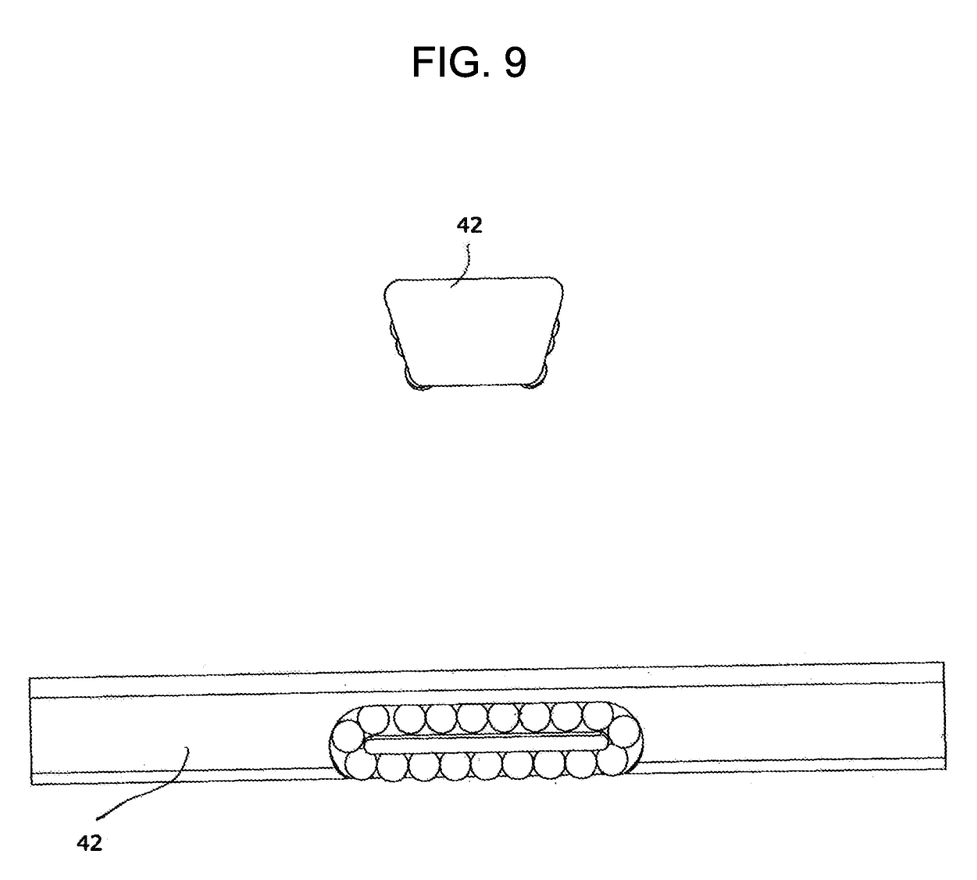
FIG. 9 shows a front view and a side view of the center-of-gravity movable body installed in the center-of-gravity movable tubes of FIG. 7. The side view also shows the center-of-gravity movable tube of FIG. 8.

It is preferred that the weight body has a section in the form of trapezoid having a width larger on the top than the width on the bottom side, and the vertical section of the weight body movable in the center-of-gravity movable tube has two ball circulation grooves in each of side surfaces and in each of corners, these ball circulation grooves are filled up with balls. This features of the preferred weight body are understood from FIGS. 7 to 9. The preferred weight body 42 is encased on a longitudinally extended dish 41*a* with a longitudinally extended cover, as is seen in FIG. 8. The extended dish 41a and cover form the center-of-gravity movable tube 41. The tube 41 is fixed by the protrusions formed in the space of the lure body.

Figure 11:
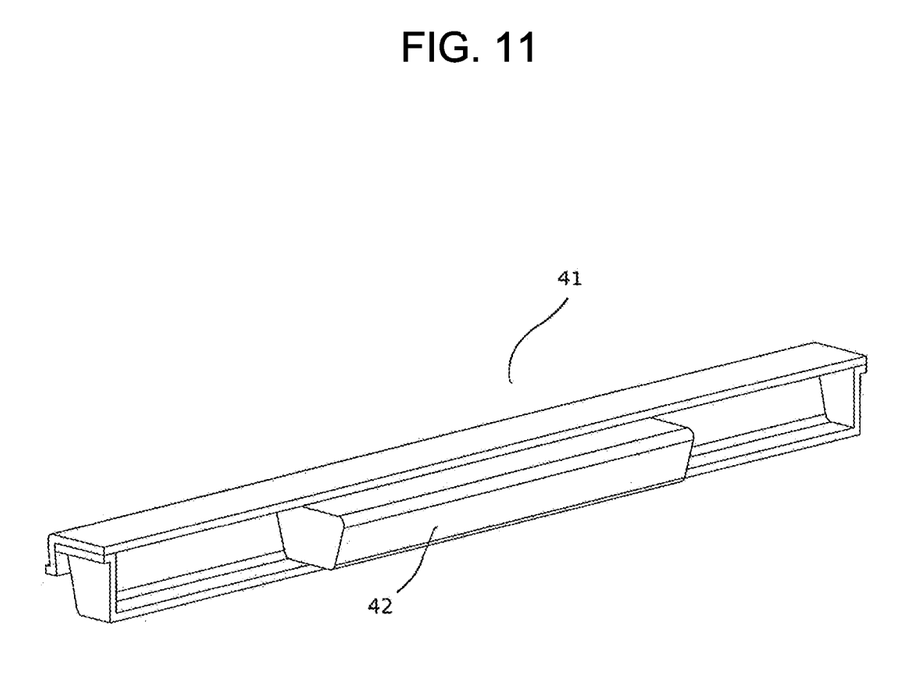
FIG. 11 shows a partially sectioned schematic view of a center-of-gravity movable tube in other configuration.

It should be noted that the weight body is not necessary to be equipped the ball circulation grooves and the balls, as is seen in FIG. 11.

Figure 10:
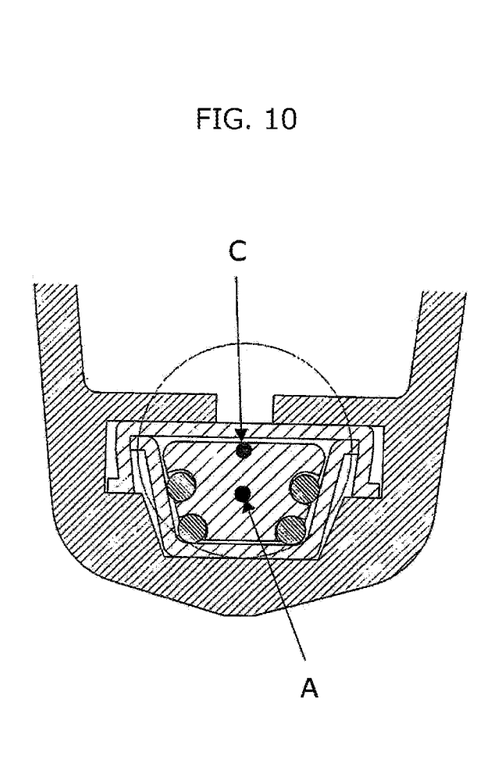
FIG. 10 is similar to FIG. 7 but indicates the centers of gravity.

For the sake of information only, a center-of-gravity movable tube having a circular section formed around an imaginary center point C which is seen in FIG. 10 is not easily installed within the fishing lures of ordinary sizes.

The body of the fishing lure of the invention can be prepared from resin materials by way of split molding. The weight body installed in the center-of-gravity movable tube is generally made of metal material. However, other materials such as a combination of metal material and resin material and ceramic materials can be used.

What is claimed is:

1. A fishing lure having appearance analogous to a small fish and comprising a hollow lure body which is provided with a forwardly slanting lip on one end, in which the hollow lure body contains therein a center-of-gravity movable tube comprising a longitudinally straight tube body which is straight from the front end to the last end of the tube body and a weight body in the form of a stick which is capable of moving in the tube body in the longitudinal direction, in which:

the center-of-gravity movable tube is installed in the lure body in the position lower than the middle height of the hollow space of the lure, and the weight body has a vertical section which is symmetrical in the width direction of the weight body and in the form of trapezoid having a width larger on a top than a width on a bottom side, and having two side surfaces which are not parallel to each other, the weight body has a pair of ball circulation grooves, each ball circulation groove being composed of two grooves connected to each other forming an oval shaped path, and being filled up with balls such that the balls rotate and circulate within each ball circulation groove, wherein, one of the two grooves of each ball circulation groove is formed on and along one of the two side surfaces of the weight body, and the other of the two grooves is formed at and along a lower corner of the weight body where the one of the two side surfaces intersects with a bottom surface at the bottom side of the weight body, the weight body does not have more than the pair of the ball circulation grooves, and when the weight body moves in the tube body in the longitudinal direction, the balls rotate and circulate within each ball circulation groove while the balls in the other of the two grooves are to be in contact with an inner surface of the tube body along the lower corner of the tube body.

2. A center-of-gravity movable tube comprising a longitudinally straight tube body and a weight body in the form of a stick which is capable of moving in the tube body in the longitudinal direction, in which the weight body contained in the center-of-gravity movable tube has a vertical section which is symmetrical in the width direction of the weight body and in the form of trapezoid having a width larger on a top than a width on a bottom side, and having two side surfaces which are not parallel to each other, the weight body has a pair of ball circulation grooves, each ball circulation groove being composed of two grooves connected to each other forming an oval shaped path, and being filled up with balls such that the balls rotate and circulate within each ball circulation groove, one of the two grooves of each ball circulation groove is formed on and along one of the two side surfaces of the weight body, and the other of the two grooves is formed at and along a lower corner of the weight body where the one of the two side surfaces intersects with a bottom surface at the bottom side of the weight body, the weight body does not have one or more other ball circulation grooves than the pair of ball circulation grooves, and when the weight body moves in the tube body in the longitudinal direction, the balls rotate and circulate within each ball circulation groove while the balls in the other of the two grooves are to be in contact with an inner surface of the tube body along the lower corner of the tube body.

\* \* \* \* \*